US011294392B2

(12) United States Patent
Ji et al.

(10) Patent No.: US 11,294,392 B2
(45) Date of Patent: Apr. 5, 2022

(54) METHOD AND APPARATUS FOR DETERMINING ROAD LINE

(71) Applicant: SAMSUNG ELECTRONICS CO., LTD., Suwon-si (KR)

(72) Inventors: Dae-hyun Ji, Hwaseong-si (KR);
Won-ju Lee, Suwon-si (KR);
Cheol-hun Jang, Pohang-si (KR);
Do-kwan Oh, Hwaseong-si (KR);
Yoon-suk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 300 days.

(21) Appl. No.: 16/524,377

(22) Filed: Jul. 29, 2019

(65) Prior Publication Data

US 2020/0064855 A1 Feb. 27, 2020

(30) Foreign Application Priority Data

Aug. 27, 2018 (KR) .......................... 10-2018-0100318

(51) Int. Cl.
*G05D 1/02* (2020.01)
*B60R 1/00* (2006.01)
(Continued)

(52) U.S. Cl.
CPC .............. *G05D 1/0246* (2013.01); *B60R 1/00* (2013.01); *G05D 1/0214* (2013.01); *G06K 9/00798* (2013.01); *G06K 9/03* (2013.01); *B60R 2300/207* (2013.01); *B60R 2300/301* (2013.01); *B60R 2300/804* (2013.01); *G05D 2201/0213* (2013.01)

(58) Field of Classification Search
CPC .............. G05D 1/0246; G05D 1/0214; G05D 2201/0213; B60R 1/00; B60R 2300/207; B60R 2300/301; B60R 2300/804; G06K 9/00798; G06K 9/03
USPC ......................................................... 701/28
See application file for complete search history.

(56) References Cited

U.S. PATENT DOCUMENTS 9,552,523 B2    1/2017  You et al.
10,474,907 B2 * 11/2019  Kozuka ................ G08G 1/0962
(Continued)

FOREIGN PATENT DOCUMENTS

JP      2016-122320 A    7/2016
KR   10-2013-0003308 A    1/2013
(Continued)

OTHER PUBLICATIONS

Communication dated Apr. 22, 2020 from the European Patent Office in application No. 19192537.9.

*Primary Examiner* — Gertrude Arthur Jeanglaude
(74) *Attorney, Agent, or Firm* — Sughrue Mion, PLLC

(57) ABSTRACT

A road line determination method and apparatus is provided. The method includes: performing detection of two road lines of a lane in which the vehicle is driving from a driving image; determining whether at least one road line of the two road lines is not detected; if it is determined that the at least one road line is not detected, determining at least one road line for the at least one undetected road line based on first information about a drivable road area comprising the road; and controlling driving of the vehicle based on the at least one determined road line.

20 Claims, 17 Drawing Sheets

(51) Int. Cl.
    *G06K 9/00*           (2022.01)
    *G06K 9/03*           (2006.01)

(56)         References Cited

U.S. PATENT DOCUMENTS

| | | |
|---|---|---|
| 2004/0183663 A1* | 9/2004 | Shimakage .......... B62D 15/029 340/436 |
| 2015/0165973 A1 | 6/2015 | Takemae |
| 2016/0046290 A1 | 2/2016 | Aharony et al. |
| 2016/0167582 A1 | 6/2016 | Chen et al. |
| 2016/0188984 A1 | 6/2016 | Kawano et al. |
| 2016/0328619 A1 | 11/2016 | Yi et al. |
| 2018/0150700 A1 | 5/2018 | Kaneko et al. |
| 2019/0095722 A1 | 3/2019 | Kang et al. |

FOREIGN PATENT DOCUMENTS

| | | |
|---|---|---|
| KR | 10-2013-0057112 A | 5/2013 |
| KR | 10-2015-0019786 A | 2/2015 |
| KR | 10-1502511 B1 | 3/2015 |
| KR | 10-2015-0058892 A | 5/2015 |
| KR | 10-1641251 B1 | 7/2016 |
| KR | 10-2019-0036844 A | 4/2019 |

* cited by examiner

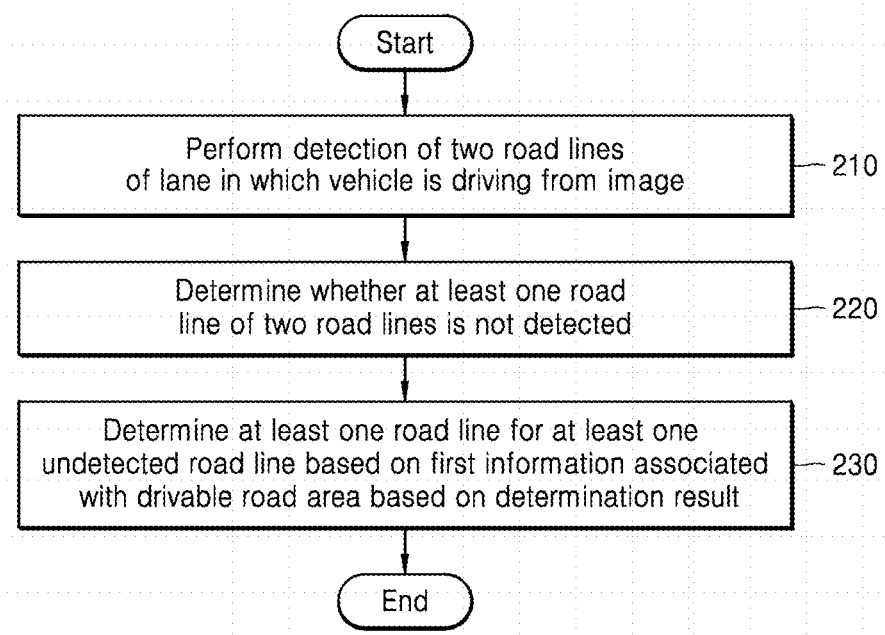

METHOD AND APPARATUS FOR DETERMINING ROAD LINE

CROSS-REFERENCE TO THE RELATED APPLICATION

This application claims priority from Korean Patent Application No. 10-2018-0100318 filed on Aug. 27, 2018 in the Korean Intellectual Property Office, the entire disclosure of which is incorporated herein in its entirely by reference.

BACKGROUND

1. Field

Apparatuses and methods consistent with exemplary embodiments of the inventive concept relate to determining a road line in a drivable road area.

2. Description of the Related Art

Visual information augmentation technologies are provided to assist steering of a vehicle and other transportation means. In such technology, various methods are used to extract a lane marking or road information from a driving image.

For example, when pixel information on a long-distance image is insufficient, when a lane marking is obscured by various objects in a road environment, when a road line is not well detected due to shadows during driving on a shoulder of the road, when a road line is worn out, or when a road line is indefinitely merged or split, it is difficult to accurately detect a road line from an image.

When accurate lane detection is not performed, difficulties may arise in providing accurate information for driving of the vehicle such as vehicle control, route determination, and the like.

SUMMARY

The inventive concept provides various exemplary methods and apparatuses for determining a road line for an undetected road line of a road considering a drivable road area when a vehicle is being driven along the road.

According to exemplary embodiments, there is provided a method of determining a road line of a road for a vehicle to drive along. The method may include: performing detection of two road lines of a lane in which the vehicle is driving from a driving image; determining whether at least one road line of the two road lines is not detected; if it is determined that the at least one road line is not detected, determining at least one road line for the at least one undetected road line based on first information about a drivable road area comprising the road; and controlling driving of the vehicle based on the at least one determined road line.

According to exemplary embodiments, there is provided an apparatus for determining a road line of a road for a vehicle to drive along. The apparatus may include: a sensor configured to acquire a driving image; and a processor configured to perform detection of two road lines of a lane in which the vehicle is driving from the driving image, determine whether at least one road line of the two road lines is not detected, determine, if it is determined that the at least one road line is not detected, at least one road line for the at least one undetected road line based on first information about a drivable road area, and control driving of the vehicle based on the at least one determined road line.

According to exemplary embodiment, there is provided a method of controlling driving of a vehicle which may include: determining whether at least one road line is not detected while the vehicle is being driven; if it is determined that the at least one road line is not detected while the vehicle is being driven, predicting at least one road line for at least one undetected road line using at least one of information about the road obtained from the driving image and pre-stored information about the road, and correcting the at least one predicted road line to be included in a drivable road area; determining the at least one corrected road line as the at least one undetected road line; and controlling the driving of the vehicle based on the at least one determined road line, wherein the drivable road area is determined based on pixel values of a driving image captured by a sensor installed in the vehicle.

BRIEF DESCRIPTION OF THE DRAWINGS

FIG. 2 illustrates an example of a method of determining a road line.

Figure 1A:
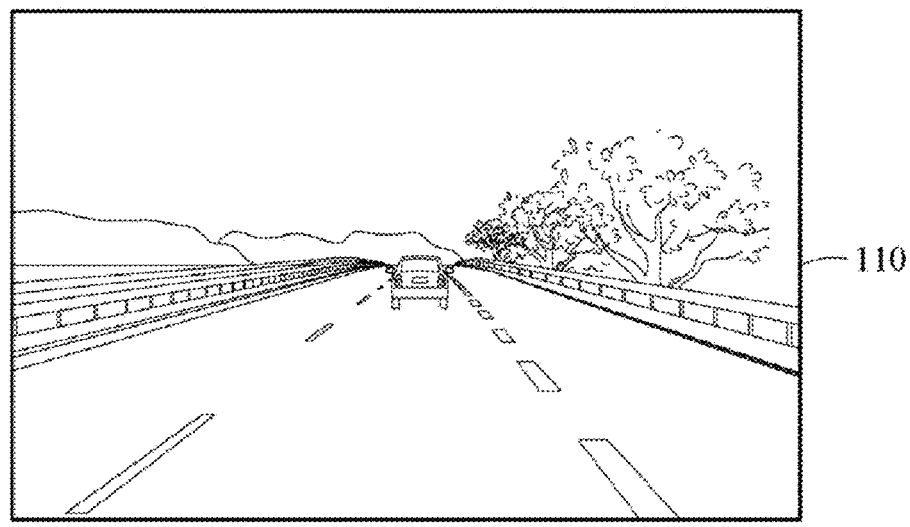
FIGS. 1A and 1B illustrate an example of a problem occurring when a road line is determined without considering a drivable road area.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed descriptions about various embodiments are provided to assist the reader in gaining a comprehensive understanding of the inventive concept. However, various changes, modifications, and equivalents of the embodiments will be apparent from these descriptions. For example, the sequences of operations described herein are merely examples, and are not limited to those set forth herein, but may be changed as will be apparent from the descriptions, with the exception of operations necessarily occurring in a certain order. Also, descriptions of features that are known in the art may be omitted for increased clarity and conciseness. The presented embodiments are all exemplary.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Examples set forth hereinafter may be used to display a virtual route or generate visual information to assist steering of an autonomous vehicle in an augmented reality (AR) navigation system of a smart vehicle. The examples may be used to interpret visual information and assist safe and pleasant driving in a device including an intelligent system such as a head-up display (HUD) installed for driving assistance or fully autonomous driving of a vehicle. The examples may be applied to, for example, an autonomous vehicle, an intelligent vehicle, a smart phone, and a mobile device. Hereinafter, the examples will be described in detail with reference to the accompanying drawings, wherein like drawing reference numerals are used for like elements.

Figure 1B:
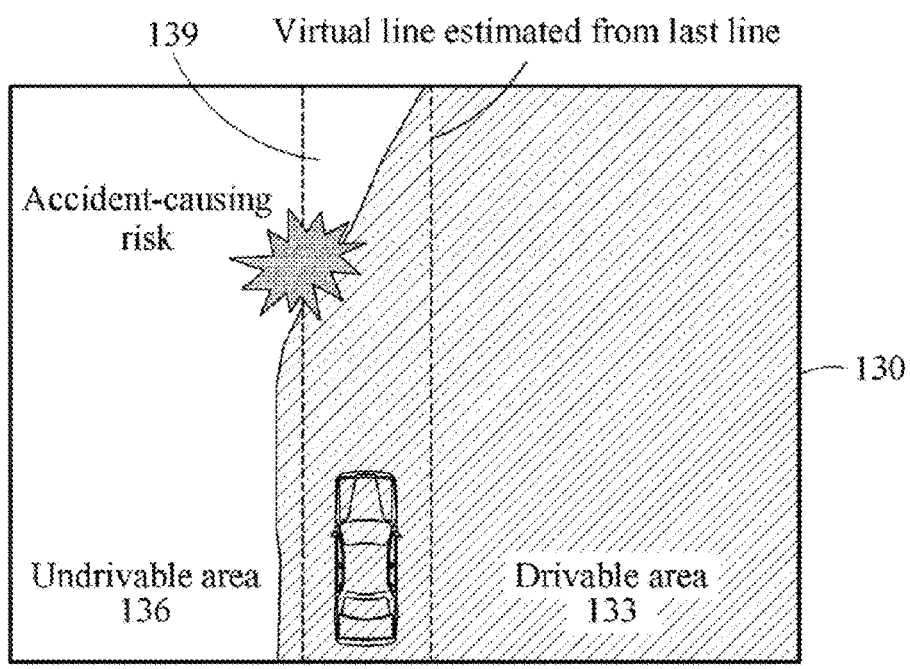

FIGS. 1A and 1B illustrate an example of a problem occurring when a road line is determined without considering a drivable road area. FIG. 1A illustrates an image 110 of a road including a lane in which a vehicle is driving, hereinafter also referred to as "driving lane," and FIG. 1B illustrates a view 130 which shows a drivable area 133 and an undrivable area 136 on the road.

For example, when the weather is cloudy, when a lane recognition is not possible on a road in front due to snow, rain, fog, etc., when cars are complexly entangled in front, when a road line is obscured by shadows and is unclearly recognized, when a road line is damaged by a car and become invisible, and when a part of a road line is lost, it may be difficult or impossible to detect the road line from the image 110 shown in FIG. 1A.

When the road line is not detected, the road line may be determined by assuming a width of a current driving lane, and mirroring a road line detected from one side as a road line of the other side or considering a last detected road line in general.

However, as illustrated in the view 130 of FIG. 1B, an actual road area 139 in front of the vehicle may be different from the drivable area 133 in which the vehicle is driving. When the actual road area 139 is different from the drivable area 133, and when the drivable area 133 is not considered at the time of road line determination, a road line determined for a road ahead may be generated in the undrivable area 136 outside the driving lane, which may cause a serious accident.

By considering a shape of the driving lane and/or the drivable area 133 (or the undrivable area 136) together at the time of the road line determination, the road line may be stably detected even when a part of the road line is lost or obscured by the shadow to be invisible. Also, an accuracy of the road line determination may be improved.

Hereinafter, a drivable area refers to road areas designated as a place where vehicles are allowed to be driven under an applicable law or regulation and some areas of sidewalks where vehicles are allowed to enter and exit, and/or areas in which vehicles are customarily allowed to drive, even if not permitted by such law or regulation, for example, a vacant lot next to a road. The drivable area is also be referred to as a drivable road area. Hereinafter, the term "drivable road" and the term "drivable road area" are understood to have the same meaning.

The undrivable area refers to areas in which car driving is not permitted by the applicable law or regulation, and/or areas in which vehicles are impossible to drive due to natural topography such as mountains, valleys, waterfalls, sea, and the like.

FIG. 2 illustrates an example of a method of determining a road line. Referring to FIG. 2, in operation 210, an apparatus for determining a road line according to an embodiment performs detection of two road lines of a lane in which a vehicle is driving from an image. Here, the image is, for example, a driving image acquired using a capturing device mounted on the vehicle. The driving image may include a single driving image or a plurality of driving images. The driving image includes a plurality of frames. The capturing device may be fixed to a predetermined area such as a windshield, a dashboard, a rear-view mirror, and the like of the vehicle to capture the driving image around the vehicle, for example, in front of the vehicle. The capturing device includes, for example, a vision sensor, an image sensor, or a device performing a similar function. The capturing device captures a single image and also captures an image for each frame depending on a case. The driving image may also be an image captured by a device other than a detection device. The driving image may be, for example, an image 310 of FIG. 3A.

In operation 210, the apparatus may perform detection of the two road lines of the lane in which the vehicle is driving based on, for example, a neural network trained to recognize a road line area including road lines. A convolutional neural network is trained to verify, for example, a bounding box of a road line to be detected from a driving image together with a type of the road line to be detected. Examples of a method of performing detection of the two road lines of the lane using the apparatus will be further described with reference to FIGS. 11 and 12.

In operation 220, the apparatus determines whether at least one road line of the two road lines is not detected. For example, in operation 220, the apparatus may determine whether the two road lines are detected, at least one road line of the two road lines is detected, or the two road lines are not detected.

In operation 230, based on a determination result of operation 220, the apparatus determines at least one road line for at least one undetected road line using first information associated with a drivable road area. The first information is, for example, a map indicating probabilities that pixels in the image correspond to the drivable road area. The map indicating probabilities that pixels in the image correspond to the drivable road area may also be referred to as a road probability map. The first information is acquired by segmenting the image of the driving lane. An example of a method of acquiring the first information using the apparatus will be further described with reference to FIGS. 3A and 3B.

The apparatus determines at least one road line for at least one undetected road line by generating a virtual road line based on, for example, road line information detected so far, currently detected road line information, and a currently detected drivable road area. Also, the apparatus corrects a road line of one side, hereinafter also referred to as "one line," detected between the two road lines based on the first information, and determines a road line of the other side corresponding to the one side, hereinafter also referred to as "the other line," based on the corrected one line.

A method of determining the other line using the apparatus when the one line of the two road lines is detected will be further described with reference to FIGS. 4 and 5. A method of determining the two road lines using the apparatus when the two road lines are not detected will be further described with reference to FIGS. 6 through 9.

The apparatus controls driving of the vehicle based on the road line for the at least one undetected road line determined in operation 230. For example, the apparatus generates control parameters for controlling a steering wheel, a brake, and an acceleration/deceleration pedal of the vehicle based on the road line for the at least one undetected road line determined in operation 230, and controls the driving of the vehicle using the control parameters.

Figure 15:
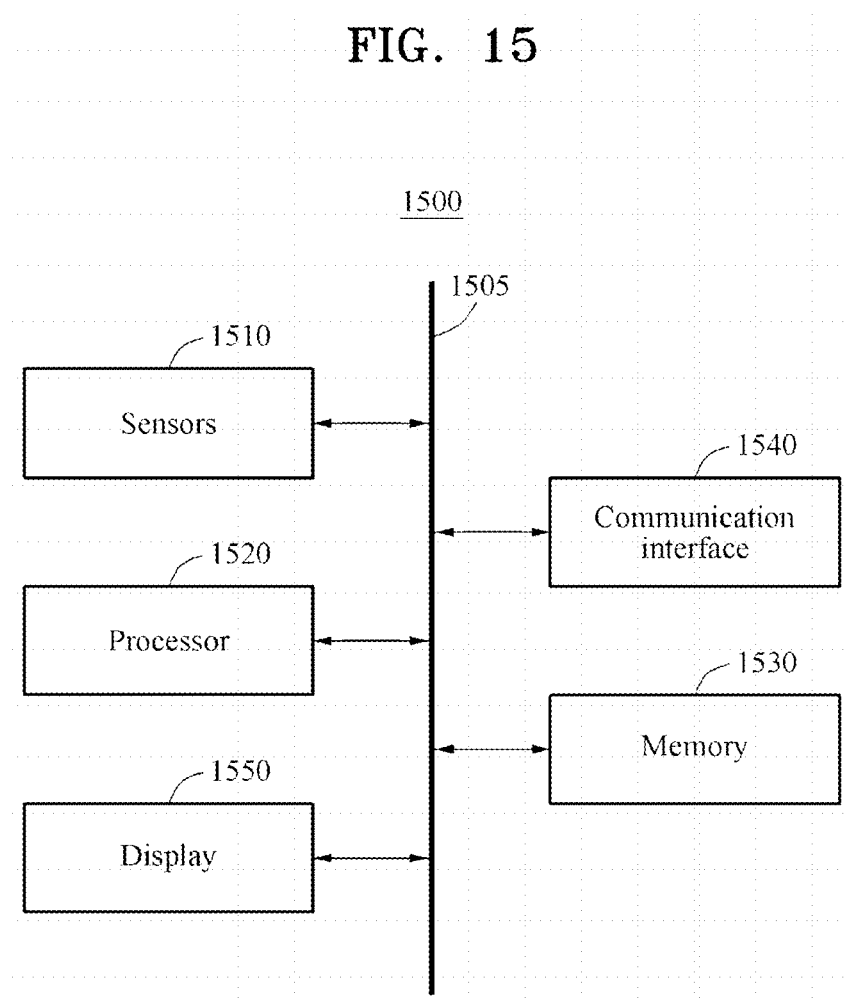
FIG. 15 illustrates an example of an apparatus for determining a road line.

Also, the apparatus displays the at least one undetected road line determined in operation 230 on a display device, for example, a display 1550 of FIG. 15.

Herein, the term "vehicle" refers to a vehicle driving on a road, and includes, for example, an autonomous or automated driving vehicle, and an intelligent or smart vehicle equipped with an advanced driver assistance system (ADAS). The term "road" refers to a way on which vehicles drive, and includes various types of roads such as, for example, a highway, a national road, a local road, an expressway, and a motorway. The road includes one or more lanes. The term "lane" refers to a road space distinguished by lines marked on a surface of the road. A single lane is distinguished by left and right lines or boundary lines thereof. The term "line" refers to a road line and includes various types of lines, for example, solid lines, broken lines, curved lines, and zigzag lines marked in white, blue or yellow on the surface of the road. The line may correspond to a line on one side that distinguishes a single lane, and may also correspond to a pair of lines, for example, a left line and a right line that distinguish a single lane.

Figure 3A:
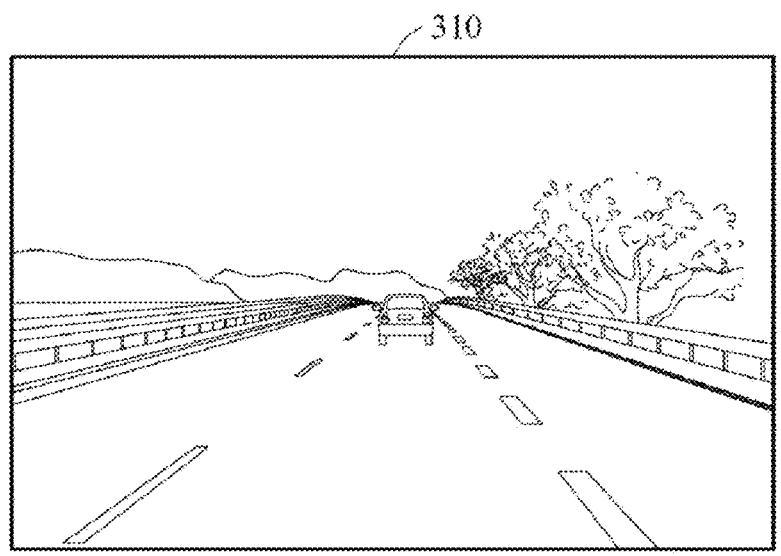
FIGS. 3A and 3B illustrate an example of a method of acquiring first information.
Figure 3B:
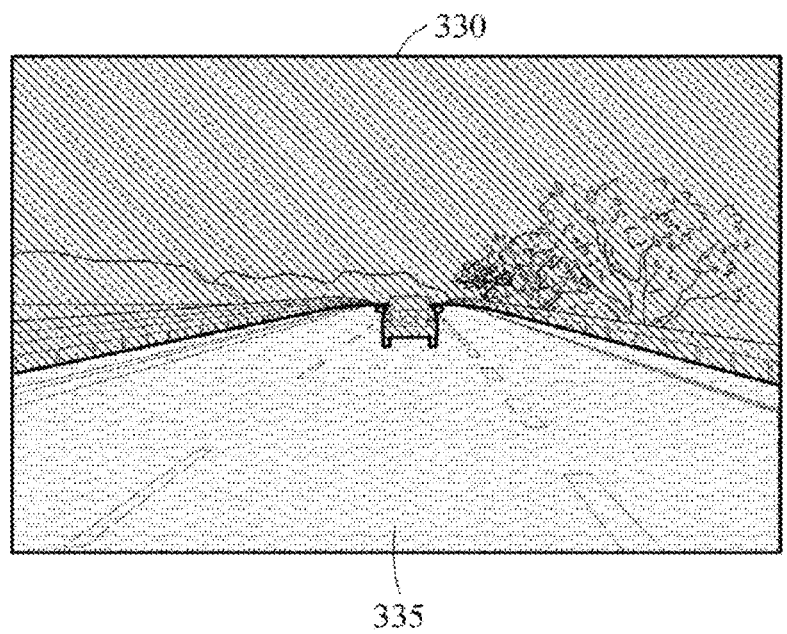

FIGS. 3A and 3B illustrate an example of a method of acquiring first information used to predict a road line for an undetected road line. FIG. 3A illustrates a driving image 310, and FIG. 3B illustrates a segmentation image 330 corresponding to the driving image 310 of FIG. 3A.

The driving image 310 includes a road image and a road surface image including, for example, other vehicles, a road line, a curb, a sidewalk, and a surrounding environment. The driving image 310 may include a road line area including vehicles and lines, and a surrounding environment area including buildings, trees, and sky.

An apparatus for determining a road line according to an embodiment separates an object from the driving image 310, and determines what the separated object (for example, a road line or a road) means in pixel units, thereby generating the segmentation image 330. The object is classified by a class unit. A class used herein may include various semantic units, for example, a road, a road line, a vehicle, a sidewalk, a human being, an animal, sky, and a building.

The apparatus generates the segmentation image 330 through a classification network including a convolution layer in several stages and a fully connected layer. The apparatus segments the driving image 310 into a plurality of regions using a classifier model that is trained to output a training output from a training image. The classifier model is, for example, a convolutional neural network. The training image may be a color image, and the training output may indicate a region image obtained by segmenting a training input. For example, the training output may be a region image that is segmented in advance based on an attribute or a class that is manually designated, for example, a road line, a road, a vehicle, a human being, an object, and a background, corresponding to each pixel of the training image.

The apparatus separates the object from the driving image 310 by a semantic unit using a well-known classification network such as AlexNet, VGGNet, and GoogleNET, acquires semantics of each segmented region by pixel unit, and labels each segmented region for each class, thereby generating the segmentation image 330. For example, instead of classifying classes of all pixels, the apparatus operates to distinguish between a pixel that belongs to a class corresponding to a drivable road and a pixel that does not belong to the class corresponding to the drivable road.

The apparatus acquires first information including probabilities that pixels correspond to classes (for example, a road, a road line, and a drivable area on a sidewalk) previously classified as a drivable road area 335 in the segmentation image 330. Depending on an example, the apparatus acquires first information including information associated with pixels having the probabilities greater than or equal to a preset threshold. For example, when a probability of 0.9 corresponding to a road class or a road line class has a probability value greater than a preset threshold of 0.758, the apparatus acquires the probability value of 0.9 of an area corresponding to the corresponding class (the road class) as the first information.

Figure 4:
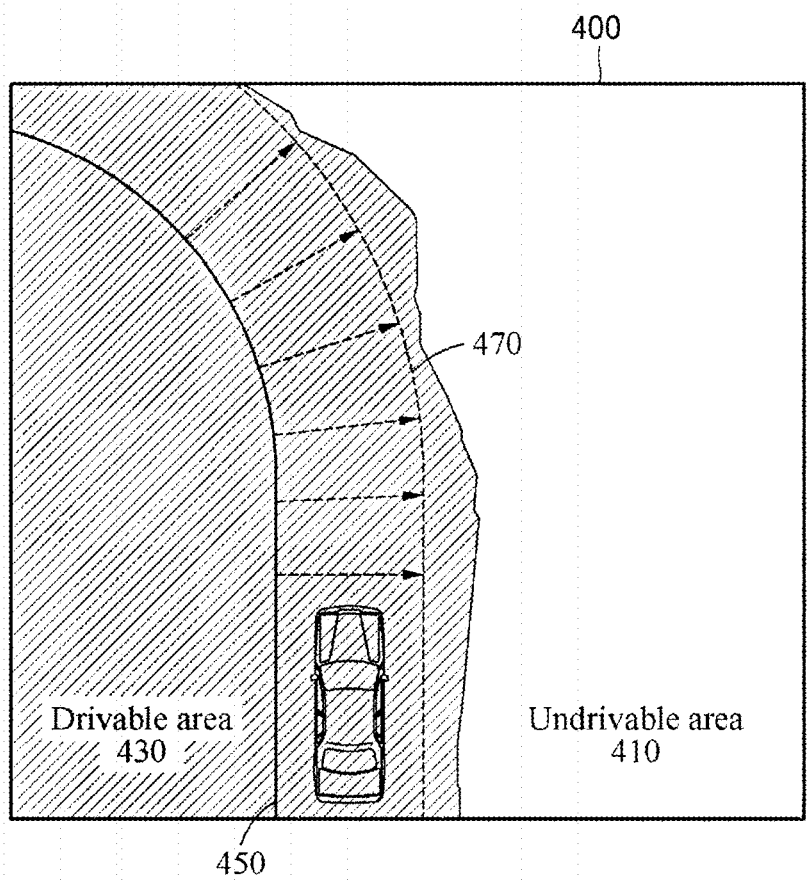
FIG. 4 illustrates an example of a method of determining an undetected road line when one line of two road lines is not detected.

FIG. 4 illustrates an example of a method of determining a road line for an undetected road line when one line of two road lines is not detected. FIG. 4 illustrates a view 400 which shows an undrivable area 410, a drivable area 430, a left line 450 detected from a driving image, and a right line 470 predicted and corrected from the left line 450.

When the left line 450 is detected from a driving image such as the driving image 310 of FIG. 3A, An apparatus for determining a road line according to an embodiment predicts a shape of a right line based on the detected left line 450. For example, when the detected left line 450 has an S shape, the apparatus predicts that the right line has the S shape.

The apparatus corrects a position of the predicted right line such that the predicted right line is within the drivable area 430 instead of the undrivable area 410. The apparatus determines the corrected right line to be the right line 470, and controls a vehicle to drive along the detected left line 450 and the corrected right line 470.

Figure 5:
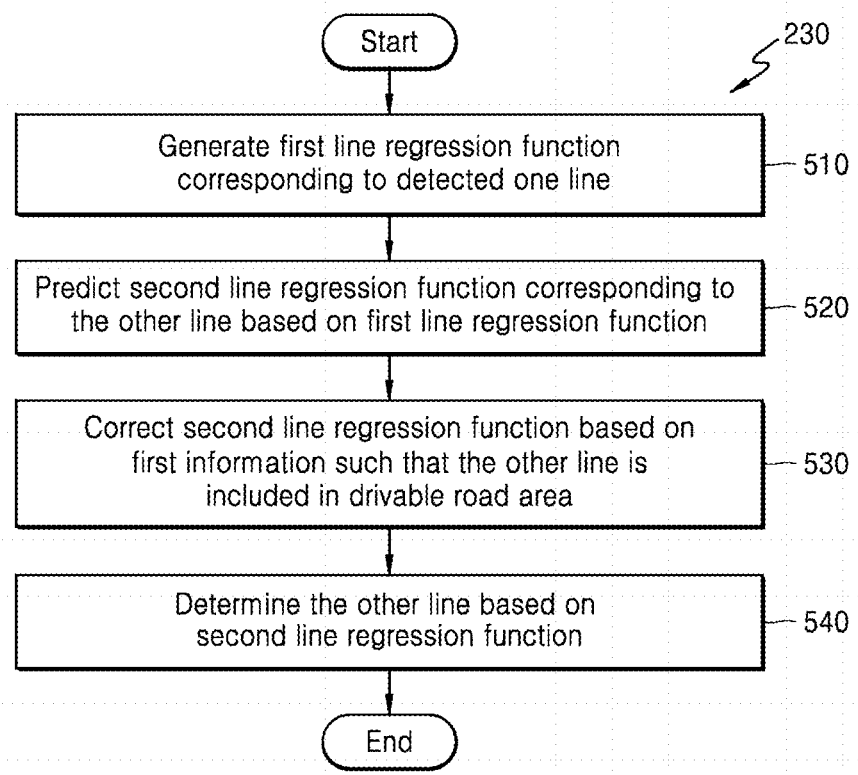
FIG. 5 illustrates an example of a method of determining an undetected road line when one line of two road lines is detected.

FIG. 5 illustrates an example of a method of determining a road line for an undetected road line when one line of two road lines is detected. FIG. 5 illustrates a method of determining a road line for an undetected road line when it is determined that one line of two road lines is detected and the other line is not detected in operation 230 of FIG. 2.

In operation 510, An apparatus for determining a road line according to an embodiment generates a first line regression function corresponding to the detected one line. The apparatus selects a plurality of waypoints located within a predetermined distance from a current position of a vehicle on a map, and calculates the first line regression function representing a shape of the detected one line of a road on the map through a linear regression analysis performed on the waypoints. The current location of the vehicle is measured using, for example, a global positioning system (GPS) sensor, an accelerometer sensor, and a compass sensor included in the apparatus. Map information includes, for example, a map representing geographic features on the earth using symbols, characters, and images, map coordinates including latitudes, longitudes, and altitudes of the geographic features, and a plurality of waypoints on a path represented on the map. Here, the plurality of waypoints is a set of coordinates obtained at preset intervals when the vehicle drives in a single lane on a road. The map information corresponds to map information at a level of a general map or map information at a level of a general navigation. The map information is stored in a memory (for example, a memory 1530 of FIG. 15) of the apparatus, or received from an external source of the apparatus through a communication interface (for example, a communication interface 1540 of FIG. 15) of the apparatus.

In operation 520, the apparatus predicts a second line regression function corresponding to the other line of the two road lines based on the first line regression function. The apparatus searches for first information associated with a drivable road area corresponding to the other line based on the first line regression function, and predicts the second line regression function based on first information having a value higher than a preset threshold among the searched first information. Also, the apparatus predicts the second line regression function corresponding to the other line (a virtual line) using an equation obtained by adding s times (s being a predetermined number, for example, 2) a width of a previous driving lane to the first line regression function as an offset.

In operation 530, the apparatus corrects the second line regression function based on the first information such that the other line is included in the drivable road area.

In operation 540, the apparatus determines the other line, that is, a road line for the undetected road line, based on the second regression function.

Figure 6:
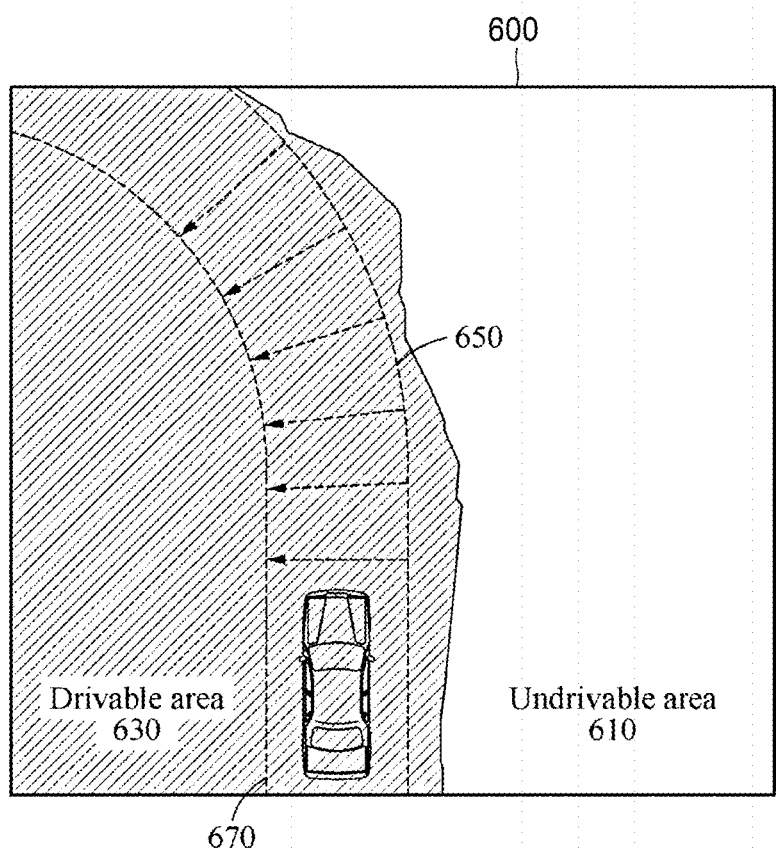
FIG. 6 illustrates an example of a method of determining an undetected road line when two road lines are not detected.

FIG. 6 illustrates an example of a method of determining a road line for an undetected road line when two road lines are not detected. FIG. 6 illustrates a view 600 which shows an undrivable area 610, a drivable area 630, and a right line 650 and a left line 670 which are predicted and corrected as explained below.

When the two road lines are not detected from a driving image such as the driving image 310 of FIG. 3A, An apparatus for determining a road line according to an embodiment predicts shapes of a right line and a left line based on a shape of the drivable area 630. The apparatus predicts that the right line has a shape curved to the left from a straight line based on the drivable area 630. The apparatus predicts a shape of the left line by generating a left line at a leftward position in a distance corresponding to a predetermined width based on the predicted right line. The apparatus corrects positions of the predicted right line and left line such that the predicted right line and left line are included in the drivable area 630. The apparatus controls the vehicle to drive along the corrected right line 650 and left line 670.

When the two road lines are not detected from the driving image, the apparatus predicts a road line of one side based on a boundary between the drivable area 630 and the undrivable area 610, and predicts a road line of the other side based on the predicted road line of the one side.

The apparatus generates a line regression function based on road line information stored for each frame until a road line is recognized from the driving image.

The apparatus predicts a position of one line, for example, a right line adjacent to the undrivable area 610 using pixels having values higher than a preset threshold among a plurality of pixels included in first information corresponding to the one line adjacent to the undrivable area 610 and the line regression function. The apparatus adjusts or moves the line regression function such that the line regression function is included in an area of the pixels having the values higher than the preset threshold and is not included in the undrivable area 610. Through this, the apparatus predicts the one line, for example, the right line adjacent to the undrivable area 610.

The apparatus predicts a position of the other line corresponding to the one line adjacent to the undrivable area 610 based on the position of the one line adjacent to the undrivable area 610. For example, the apparatus predicts a leftward position at a distance (or a predetermined lane width) from the position of the right line adjacent to the undrivable area 610, as the position of the other line.

Examples of determining road lines for two undetected road lines using the apparatus will be further described with reference to FIGS. 7 through 9.

Figure 7:
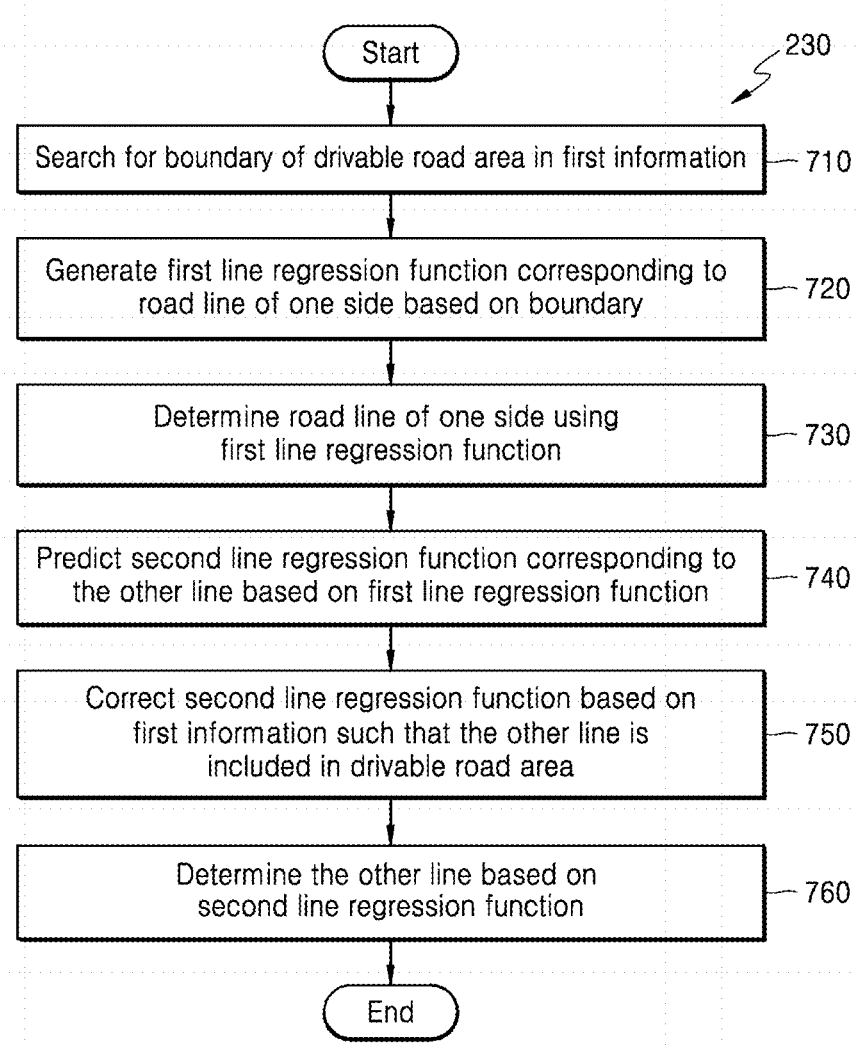
FIGS. 7 through 9 illustrate examples of a method of determining two undetected road lines.

FIG. 7 illustrates an example of a method of determining road lines for two undetected road lines. FIG. 7 illustrates a method of determining road lines for two undetected road lines using a boundary of a road area when two road lines are not detected in operation 230 of FIG. 2.

When the two road lines are not detected, an apparatus for determining a road line according to an embodiment predicts one line of the two road lines based on first information, and predicts the other line corresponding to the one line based on the one line.

In operation 710, the apparatus searches for a boundary of a drivable road area from the first information. As described with reference to FIG. 6, the apparatus searches for an undrivable area from the first information, and searches for the boundary of the drivable area based on the undrivable area.

In operation 720, the apparatus generates a first line regression function corresponding to a road line of one side based on the boundary of the drivable road area.

In operation 730, the apparatus determines the road line of one side using the first line regression function. Since the description of operations 520 through 540 is also applicable to operations 740 through 760, repeated description will be omitted.

Figure 8:
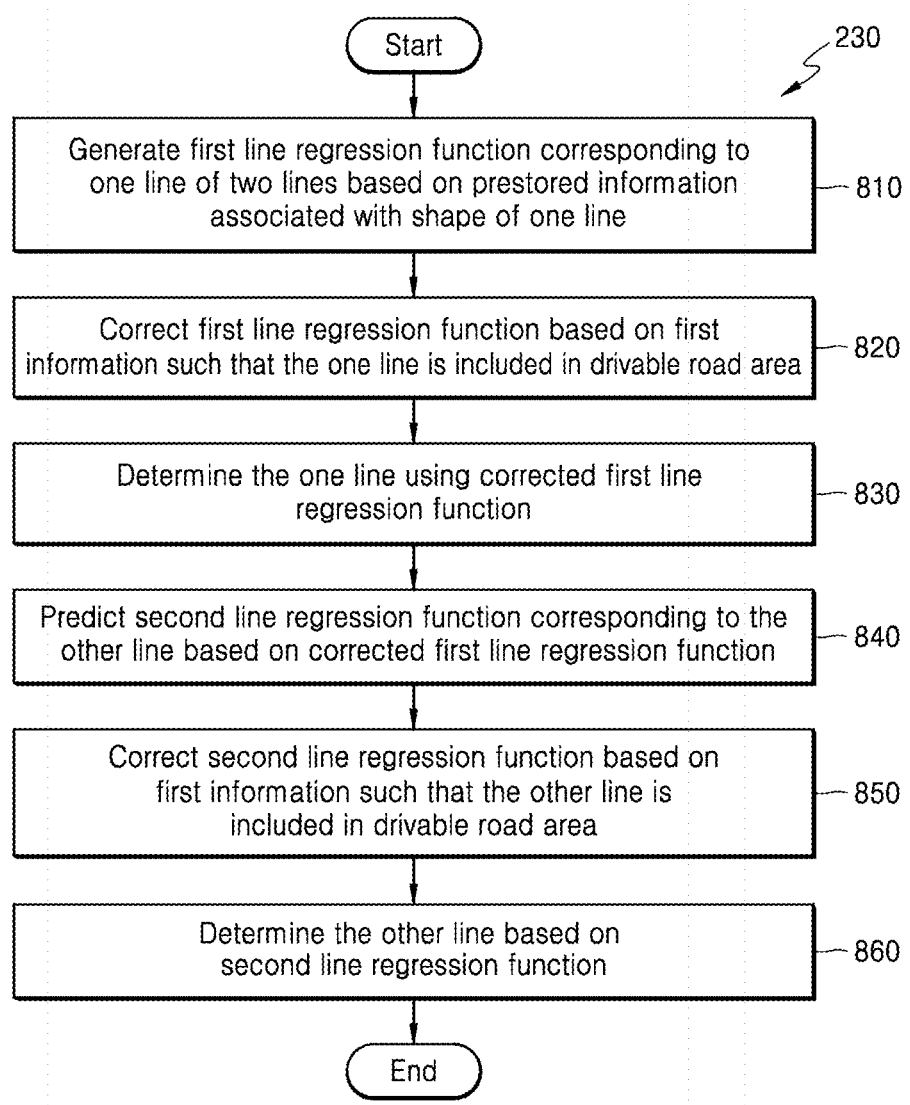

FIG. 8 illustrates an example of a method of determining road lines for two undetected road lines. FIG. 8 illustrates a method of determining a road line for an undetected road line using a previous driving road when two road lines are not detected in operation 230 of FIG. 2.

An apparatus for determining a road line according to an embodiment predicts one line of two road lines based on prestored information associated with a shape of the one line and corrects the one line based on first information. The apparatus determines the one line of the two road lines, and then determines the other line corresponding to the one line based on the one line.

In operation 810, the apparatus generates a first line regression function corresponding to one line of two road lines based on prestored information associated with a shape of the one line. The apparatus generates prolonged lines extending from lines along which a vehicle has driven, and calculates a line regression function corresponding to the prolonged lines, thereby calculating the first line regression function corresponding to the one line.

In operation 820, the apparatus corrects the first line regression function based on first information such that the one line is included in a drivable road area. The apparatus corrects the first line regression function to be in an area or a location corresponding to pixels having values higher than a preset threshold among a plurality of pixels included in the first information, so that the first line regression function calculated in operation 820 is included in the drivable road area.

In operation 830, the apparatus determines the one line using the first line regression function corrected in operation 820. Since the description of operations 520 through 540 is also applicable to operations 840 through 860, repeated description will be omitted.

Figure 9:
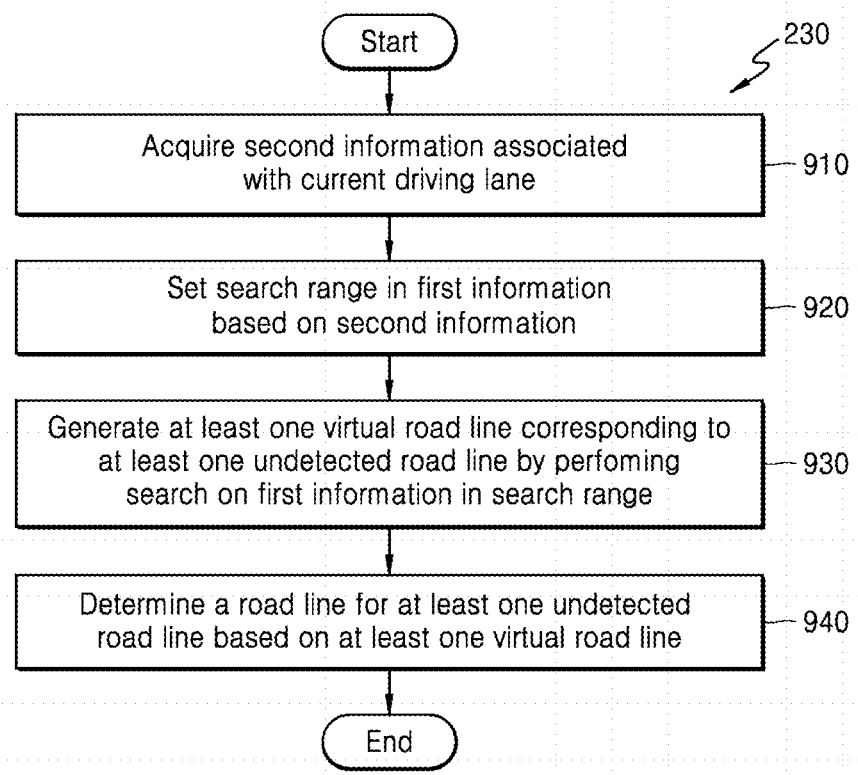

FIG. 9 illustrates an example of a method of determining road lines for two undetected road lines. FIG. 9 illustrates a method of determining a road line for an undetected road line by setting a search range when at least one road line is not detected in operation 230.

In operation 910, an apparatus for determining a road line according to an embodiment acquires second information about a current driving lane. The apparatus acquires the second information by generating prolonged lines extending from lines of a lane in which a vehicle has driven. The apparatus determines the second information based on, for example, any one or any combination of information about a road line detected from a driving image, information about a shape of a previous driving road, information about a shape of a drivable road detected from first information, and waypoint information corresponding to a current location of the vehicle. Example of a method of determining the second information using the apparatus will be further described with reference to FIG. 10.

In operation 920, the apparatus sets a search range in the first information based on the second information. The apparatus sets an offset range indicating the search range based on a first line regression function generated based on the second information. Here, the search range includes pixels corresponding to at least one candidate road line among a plurality of pixels included in the first information.

In operation 930, the apparatus generates at least one virtual road line for at least one undetected road line by performing a search on the first information in the search range. The apparatus extracts pixels having values higher than a preset threshold among a plurality of pixels included in the search range. The apparatus generates at least one virtual road line by generating a second line regression function based on the extracted pixels.

In operation 940, the apparatus determines a road line for at least one undetected road line based on the at least one virtual road line generated in operation 930.

Figure 10A:
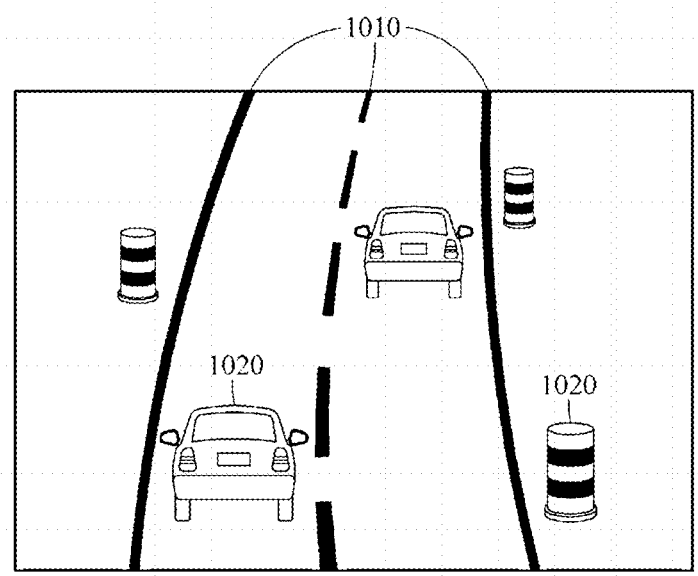
FIGS. 10A through 10C illustrate examples of a method of acquiring second information.
Figure 10B:
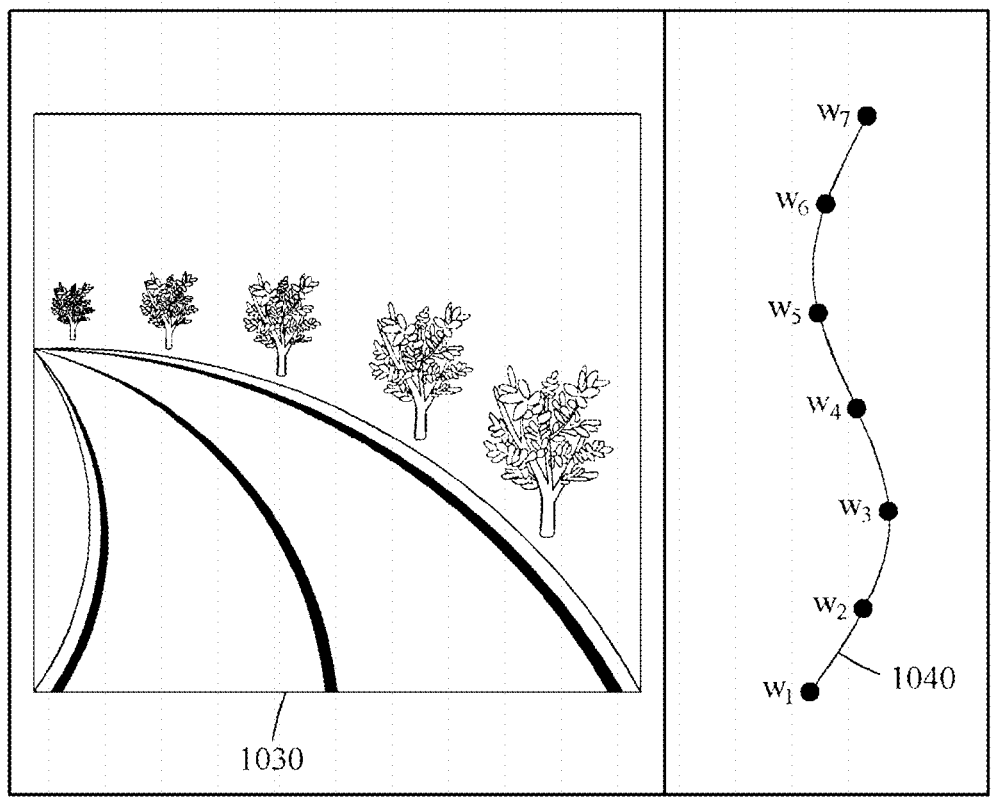
Figure 10C:
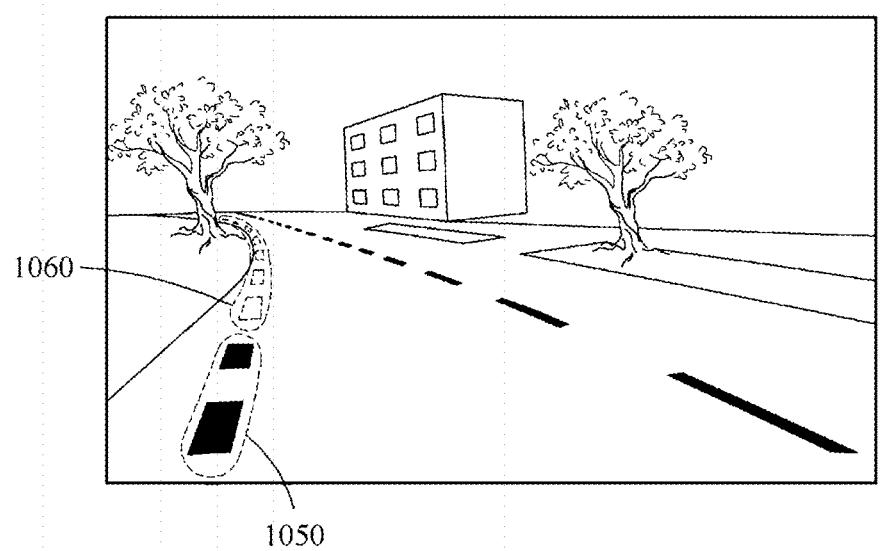

FIGS. 10A through 10C illustrate examples of a method of acquiring second information. FIG. 10A illustrates line information about a road line recognized from a driving image.

An apparatus for determining a road line according to an embodiment acquires road line information about road lines 1010 from a driving image using a neural network trained to recognize a road line area including road lines from the driving image. The neural network distinguishes between the road line information about the road lines 1010 and objects 1020 such as a vehicle other than the road lines 1010, and verifies a type of the road lines 1010. The apparatus acquires second information about a shape of a lane, for example, positions and shapes of left and right lines of the lane, and a width of the lane from the road line information about the road lines 1010.

FIG. 10B illustrates waypoint information 1040 about waypoints W1, W2, W3, W4, W5, W6, and W7 acquired from a map 1030. An apparatus for determining a road line according to an embodiment determines or predict a line regression function, for example, a first degree equation, a second degree equation, a third degree equation, or a curve (a clothoid) corresponding to a road on which a vehicle is driving based on map information corresponding to a location of the vehicle, and detects a road line from a driving image using the line regression function.

The apparatus regresses the waypoint information 1040 of the waypoints W1, W2, W3, W4, W5, W6, and W7 extracted from the map 1030 based on a current location of the vehicle, thereby recognizing that the road is in a curved shape or an S shape.

The apparatus determines a line regression function suitable for expressing the shape, for example, an S-curve shape of the road. The apparatus determines the second degree equation, for example, $c_2x^2+c_1x+c_0$ for the waypoint W1 as the line regression function and determines the third degree equation, for example, $c_3x^3+c_2x^2+c_1x+c_0$ for the waypoint W3 as the line regression function.

The apparatus assigns a greater regression weight to the line regression function of the waypoint W3 in comparison to the line regression function of the waypoint W1 such that a curve is appropriately expressed.

The apparatus recognizes the shape of the road on the map based on the waypoint information and determines the line regression function corresponding to the lane based on the shape of the road. The apparatus assigns the regression weight corresponding to the lane through, for example, a regression analysis performed on the waypoint information. The apparatus determines the second information associated with the shape of the lane using the line regression function corresponding to the lane.

Also, the apparatus determines the second information with increased accuracy and speed by detecting the lane using the line regression function considering a degree determined for a predetermined interval of the waypoint information or each coordinate point of the waypoint information, and the regression weight such that the shape of the road indicated by the waypoint information is the most suitably expressed.

FIG. 10C illustrates a virtual road line or a prolonged line 1060 determined based on shape information 1050 of a road on which a vehicle has driven.

An apparatus for determining a road line generates prolonged lines extending from road lines along which the vehicle has driven to acquire the second information. The apparatus determines a local path corresponding to lines 1050 of a lane in which the vehicle has driven and extends lines of the lane based on the local path, thereby generating the prolonged lines 1060. The apparatus sets a search range in first information such that the prolonged lines 1060 are included in a drivable road area. The apparatus extracts pixels having probability values higher than a preset threshold among a plurality of pixels included in the search range and determines the second information using a regression function generated based on the extracted pixels.

Figure 11:
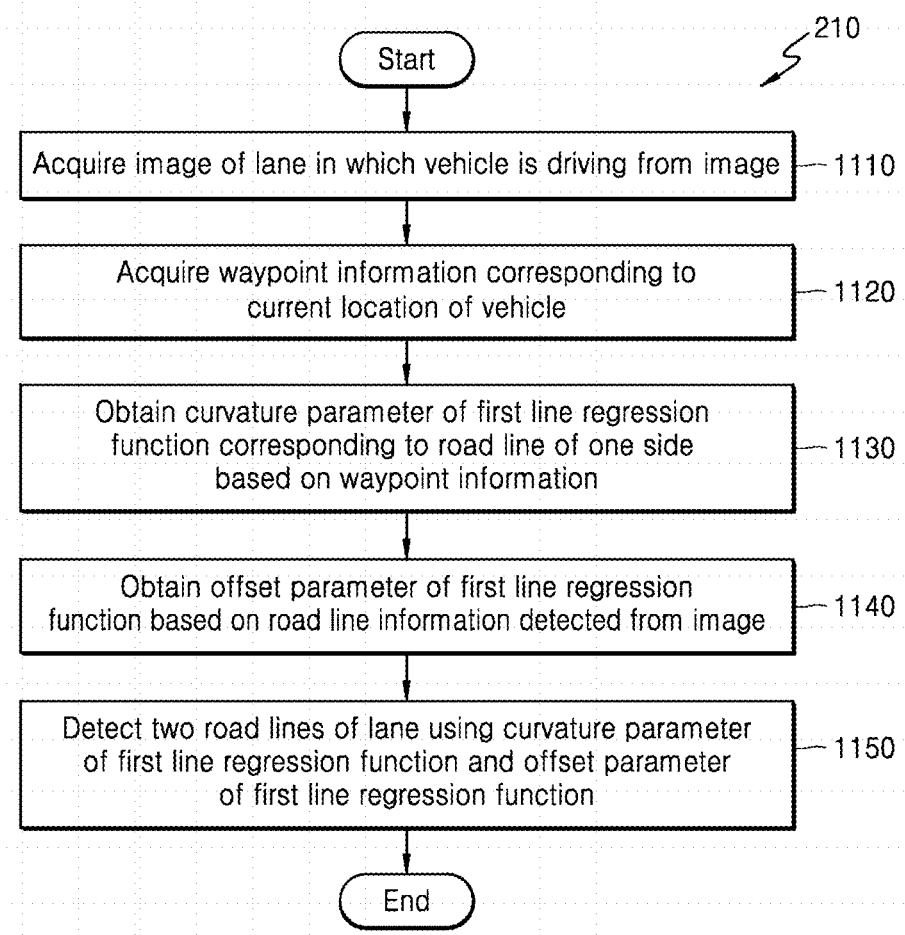
FIG. 11 illustrates an example of a method of detecting two road lines of a lane in which a vehicle is driving from an image.
Figure 12:
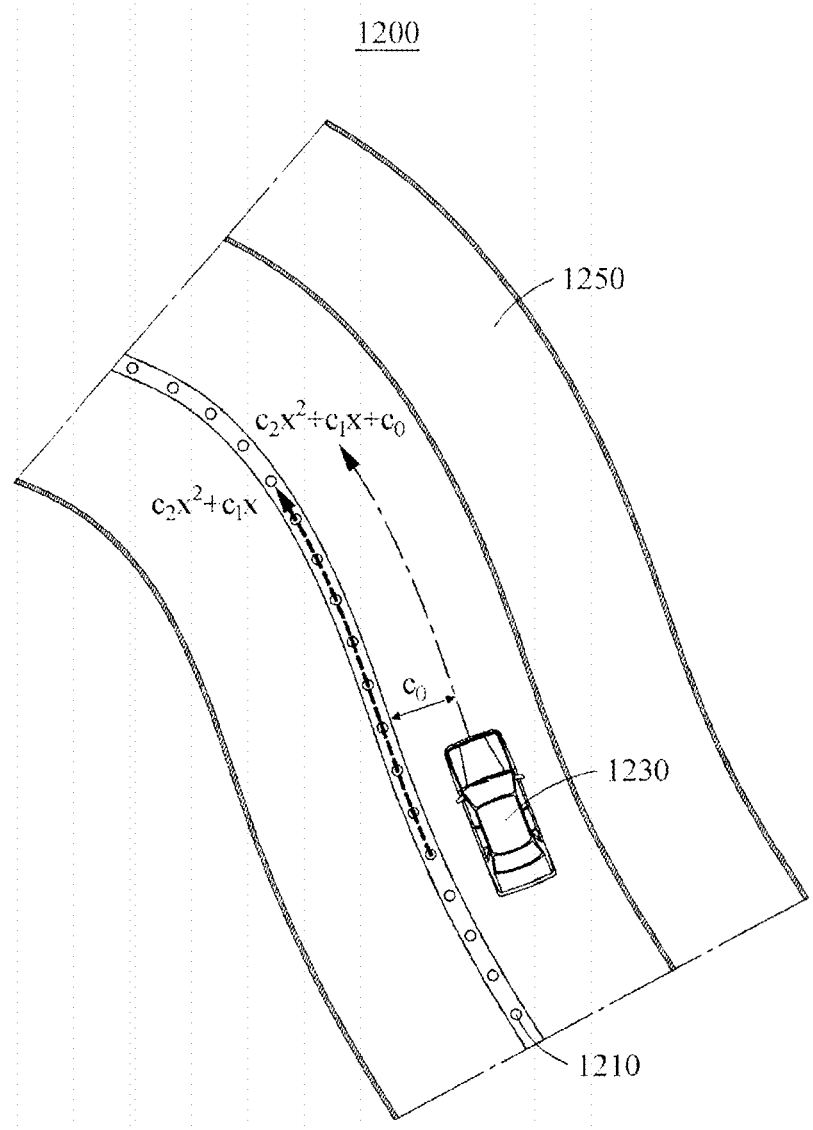
FIG. 12 illustrates an example of a method of calculating an offset parameter and a curvature parameter of a first line regression function.

FIG. 11 illustrates an example of a method of performing detection of two road lines of a lane in which a vehicle is driving from a driving image, and FIG. 12 illustrates an example of a method of obtaining an offset parameter and a curvature parameter of a first line regression function.

Referring to FIGS. 11 and 12, in operation 1110, an apparatus for determining a road line acquires an image of a lane in which a vehicle is driving from a driving image.

In operation 1120, the apparatus acquires waypoint information corresponding to a current location of a vehicle 1230 as indicated by a reference numeral 1210 of FIG. 12. In this example, the waypoint information corresponds to a portion of points of a road on a map corresponding to a road 1250 on which the vehicle 1230 is driving and/or coordinates of the portion of the points. The apparatus determines curvature information about the road on which the vehicle 1230 is driving using a plurality of waypoints located within a waypoint corresponding to a look-ahead distance from a waypoint adjacent to the current location of the vehicle 1230 on the map. The term "look-ahead distance" refers to a distance to which information for driving of the vehicle 1230 is to be required, and is determined based on, for example, any one or a combination of a speed of the vehicle 1230, a visible distance, a weather, a driving situation, and a road condition of the vehicle 1230. Also, the look-ahead distance corresponds to a distance that appropriately represents the plurality of waypoints based on a degree of a line regression function, for example, a polynomial equation.

Two road lines may be detected based on the road line information detected from the driving image including the lane image in operation 1110 and the waypoint information acquired in operation 1120. In operation 1130, the apparatus obtains a curvature parameter of a first line regression function corresponding to a road line of one side based on the waypoint information.

The apparatus calculates the first line regression function (for example, $c_2 x^2 + c_1 x$) expressing a shape of the road 1250 on the map through, for example, a linear regression analysis, and determines curvature information $C_1$ and $C_2$ of the road 1250 using the first line regression function.

In operation 1140, the apparatus obtains an offset parameter of the first degree regression function based on the road line information detected from the driving image. The apparatus detects a line area including road lines from the driving image, and estimates a lateral offset $C_0$ of the vehicle 1240 using the line area and a reference line based on the curvature information. When the curvature information is 0, the reference line may be a straight-line. When the curvature information is greater than 0, the reference line may be a curved line. The curved line includes, for example, a curved line having a curvature in one direction, a curved line having curvatures in at least two directions, a curved line corresponding to at least a portion of a circle, and a curved line corresponding to at least a portion of an ellipse. The lateral offset of the vehicle 1230 corresponds to a distance from a center line of the road 1250 to a center of the vehicle 1230.

In operation 1150, the apparatus detects two road lines of the lane using the curvature parameter of the first line regression function and the offset parameter of the first line regression function. The apparatus acquires a line regression function such as $c_2 x^2 + c_1 x + c_0$ using the curvature parameter of the first line regression function and the offset parameter of the first line regression function. The apparatus detects the two road lines of the lane using a width of the lane obtained by multiplying, for example, two times an offset in the acquired line regression function.

In addition to the examples described above, various schemes of detecting a road line may be used. When at least one road line is not detected, a road line for an undetected road line may be determined based on the aforementioned examples.

Figure 13:
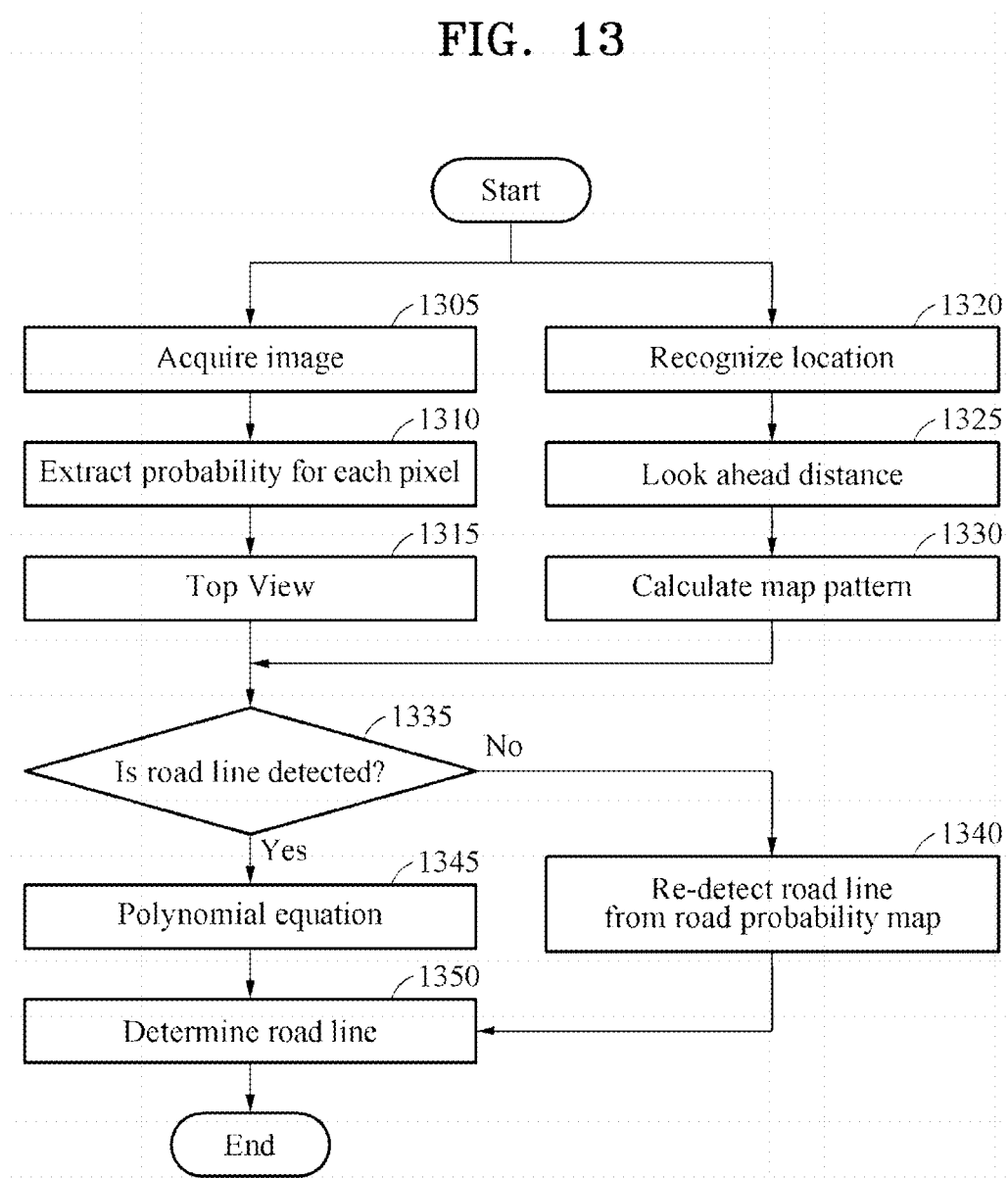
FIGS. 13 and 14 illustrate examples of a method of determining a road line.

FIG. 13 illustrates an example of a method of determining a road line. Referring to FIG. 13, in operation 1305, an apparatus of determining a road line acquires a driving image. In operation 1310, the apparatus extracts a probability for each pixel from the driving image and generates a segmentation image. In this example, the apparatus generates the segmentation image by distinguishing an object or a road line area from the driving image through a classification of a pixel level. In operation 1315, the apparatus converts the segmentation image with a distinguished road line into a top-view image.

In operation 1320, the apparatus recognizes a current location of a vehicle based on, for example, GPS information and map information. In operation 1325, the apparatus searches for a plurality of waypoints located within a waypoint corresponding to a look-ahead distance from the current location of the vehicle recognized in operation 1320. In operation 1330, the apparatus calculates a map pattern using the plurality of waypoints found by the searching in operation 1325.

In operation 1335, the apparatus determines whether a road line of a lane in which the vehicle is driving is detected using the top-view image generated in operation 1315 and the map pattern calculated in operation 1330.

When the road line is detected in operation 1335, the apparatus determines a polynomial equation corresponding to the detected road line in operation 1345. The polynomial equation corresponding to the detected road line is, for example, $c_2 x^2 + c_1 x + c_0$. As illustrated in FIG. 12, the apparatus calculates fitting scores between a reference line having curvature information $C_1$ and $C_2$ and road lines included in the top-view image while moving the reference line in by pixel units, for example, a single pixel. The apparatus detects road lines based on the calculated fitting scores and determines two road lines adjacent to a lateral position of the vehicle. The apparatus determines a polynomial equation based on the lateral offset $C_0$ and the curvature information $C_1$ and $C_2$ of the road acquired in advance. The determined polynomial equation may correspond to a line regression function that represents a shape of the road corresponding to a driving path of the vehicle and a location of the vehicle in a driving lane.

In operation 1350, the apparatus determines the road line using the polynomial equation determined in operation 1345.

Also, the apparatus generates various control parameters for controlling driving of the vehicle, for example, a steering wheel, a brake, and an acceleration/deceleration pedal of the vehicle using the polynomial equation determined in operation 1345, and outputs the control parameters. The apparatus determines a path of the vehicle using the line regression function.

When the road line is not detected in operation 1335, the apparatus re-detects, in operation 1340, a road line that failed in detection in operation 1335 from a road probability map indicating probabilities that pixels in the image correspond to a drivable road area. The aforementioned examples of predicting a road line for an undetected road line may be applied to operation 1340.

In operation 1350, the apparatus determines the road line re-detected from the road probability map to be a final road line.

A method of providing information for driving of a vehicle may also be applied to provide control information and detect a control line for a path control of a robot in a robot system requiring a precise control in various industrial environments such as a smart factory and an indoor robot application with map information in addition to an autonomous driving system.

Figure 14:
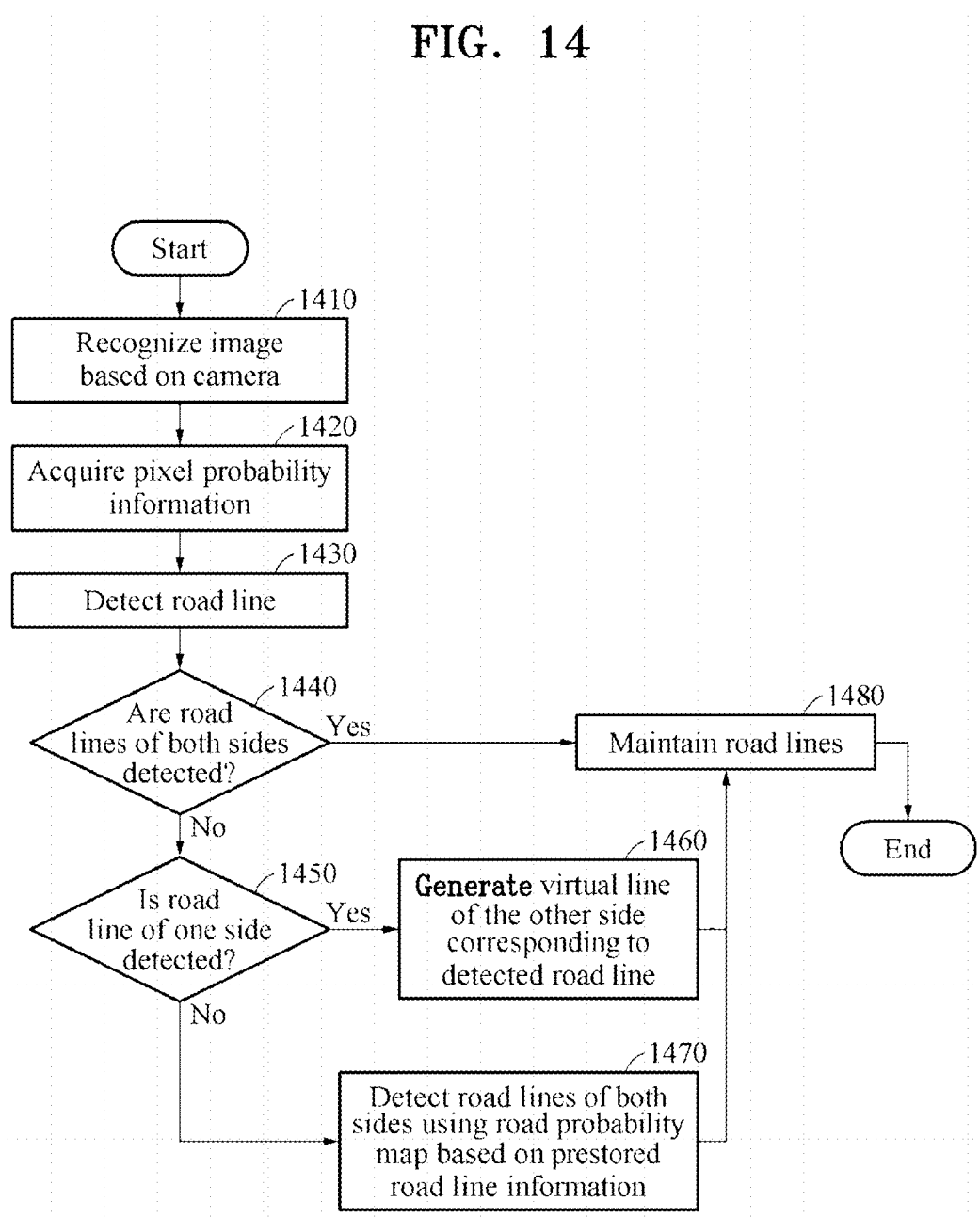

FIG. 14 illustrates an example of a method of determining a road line. Referring to FIG. 14, in operation 1410, an apparatus for determining a road line recognizes a driving image based on a camera. In operation 1420, the apparatus acquires pixel probability information from the recognized image.

In operation 1430, the apparatus detects a road line based on the pixel probability information.

In operation 1440, the apparatus determines whether road lines of both sides are detected from a lane in which a vehicle is driving. When it is determined that the road lines of both sides are detected in operation 1440, the apparatus maintains the road lines so that the vehicle is driven in the lane in operation 1480.

When it is determined that both of the road lines are not detected in operation 1440, the apparatus determines whether a road line of one side is detected in operation 1450. When it is determined that the road line of the one side is detected in operation 1450, the apparatus generates a virtual line of the other side corresponding to the detected road line of the one side in operation 1460.

When it is determined that no line of either side is detected in operation 1450, the apparatus determines the road lines of both sides using a road probability map based on prestored road line information in operation 1470.

Although not shown, embodiments of determining road lines for the undetected road line based on information associated with the drivable road area may be applied to operations 1460 and 1470.

FIG. 15 illustrates an example of an apparatus for determining a road line. Referring to FIG. 15, an apparatus 1500 of determining a road line includes sensors 1510 and a processor 1520. The apparatus 1500 also includes a memory 1530, a communication interface 1540, and a display 1550. The sensors 1510, the processor 1520, the memory 1530, the communication interface 1540, and the display 1550 communicate with one another through a communication bus 1505.

The sensors 1510 include, for example, an image sensor, an accelerometer sensor, a compass sensor, a GPS sensor, a gyro sensor, an odometer, and a geomagnetic sensor. The sensors 1510 acquire positioning information indicating a location of a vehicle. Also, the sensors 1510 captures a driving image of the vehicle.

The processor 1520 detects two road lines of a lane in which the vehicle is driving from an image. The processor 1520 determines a road line for at least one undetected road line using first information associated with a drivable road area based on a result obtained by determining whether at least one of the two road lines is not detected.

The apparatus 1500 receives sensing information through the communication interface 1540. In an example, the communication interface 1540 receives sensing information from other sensors outside the apparatus 1500. In another example, the communication interface 1540 receives a driving image, map information, and GPS information from an external source of the apparatus 1500.

The processor 1520 outputs information for driving of the vehicle through the communication interface 1540. The information for the driving of the vehicle includes a control parameter for controlling any one or any combination of a driving direction, an angle of a steering wheel, and a speed of the vehicle based on a local path of the vehicle.

The processor 1520 performs at least one of the methods described with reference to FIGS. 1 through 14 or an algorithm corresponding to at least one of the methods.

The term "processor," as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA).

The processor 1520 executes a program and controls the apparatus 1500. Codes of the program executed by the processor 1520 are stored in the memory 1530.

The memory 1530 stores various images including the driving image and the map information. The memory 1530 stores various information generated during a processing operation of the processor 1520. Also, the memory 1530 stores a variety of data and programs. The memory 1530 includes a volatile memory or a non-volatile memory. The memory 1530 includes a large-capacity storage medium such as a hard disk to store the variety of data.

The display 1550 displays a road line determined by the processor 1520 and the map information separately or together.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the inventive concept and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the inventive concept is defined not by the detailed description, but by the claims and their equivalents, and all variations within the scope of the inventive concept and their equivalents are to be construed as being included in the inventive concept.

What is claimed is:

1. A method of determining a road line of a road for a vehicle to drive along, the method comprising:
    performing detection of two road lines of a lane in which the vehicle is driving from a driving image;
    determining whether at least one road line of the two road lines is not detected;
    if it is determined that the at least one road line is not detected, determining at least one road line for the at least one undetected road line based on first information about a drivable area comprising the road; and
    controlling driving of the vehicle based on the at least one determined road line,
    wherein the first information comprises a map indicating probabilities that pixels in the driving image correspond to the drivable area.

2. The method of claim 1, wherein the first information is obtained by determining the drivable area and an undrivable area,
    wherein the drivable area further comprises an area which is not the road, and
    wherein the at least one road line is determined to be included in the drivable area.

3. The method of claim 1, wherein, if it is determined that one road line of the two road lines is detected and the other road line of the two road lines is not detected, the determining the at least one road line for the at least one undetected road line comprises:
    predicting the other road line based on the one road line; and
    correcting the predicted road line based on the first information.

4. The method of claim 3, wherein the predicting the other road line comprises predicting a second line regression function corresponding to the other road line based on a first line regression function corresponding to the one road line, and wherein the correcting the other road line comprises correcting the second line regression function such that the other road line is included in the drivable area.

5. The method of claim 1, wherein, if it is determined that the two road lines are not detected, the determining the at least one road line for the at least one undetected road line comprises:

predicting one road line of the two road lines based on the first information; and predicting the other road line of the two road lines corresponding to the one road line based on the predicted one road line.

6. The method of claim 5, wherein the predicting the one road line comprises:

searching for a boundary of the drivable area from the first information; and generating a first line regression function corresponding to the one road line based on the boundary.

7. The method of claim 6, wherein the searching comprises:

searching for an undrivable area from the first information; and searching for the boundary based on the undrivable area.

8. The method of claim 1, wherein, if it is determined that the two road lines are not detected, the determining the at least one road line for the at least one undetected road line comprises:

predicting one road line of the two road lines based on prestored information about a shape of the road; and correcting the predicted road line based on the first information.

9. The method of claim 8, wherein the predicting the one road line comprises generating a first line regression function corresponding to the one road line based on the prestored information, and wherein the correcting the one road line comprises correcting the first line regression function such that the predicted road line is included in the drivable area.

10. An apparatus for determining a road line of a road for a vehicle to drive along, the apparatus comprising:

a sensor configured to acquire a driving image; and
a processor configured to:
perform detection of two road lines of a lane in which the vehicle is driving from the driving image;
determine whether at least one road line of the two road lines is not detected;
determine, if it is determined that the at least one road line is not detected, at least one road line for the at least one undetected road line based on first information about a drivable area; and
control driving of the vehicle based on the at least one determined road line, wherein the first information comprises a map indicating probabilities that pixels in the driving image correspond to the drivable area.

11. The apparatus of claim 10, wherein the first information is obtained by determining the drivable area and an undrivable area, wherein the drivable area further comprises an area which is not the road, and wherein the at least one road line is determined to be included in the drivable area.

12. The apparatus of claim 10, wherein, if it is determined that one road line of the two road lines is detected and the other road line of the two road lines is not detected, the processor is configured to predict the other road line based on the one road line, and correct the predicted road line based on the first information.

13. The apparatus of claim 12, wherein the processor is configured to predict a second line regression function corresponding to the other road line based on a first line regression function corresponding to the one road line, and correct the second line regression function such that the other road line is included in the drivable area.

14. The apparatus of claim 10, wherein, if it is determined that the two road lines are not detected, the processor is configured to predict one road line of the two road lines based on the first information, and predict the other road line of the two road lines corresponding to the one road line based on the predicted one road line.

15. The apparatus of claim 14, wherein the processor is configured to search for a boundary of the drivable area from the first information, and generate a first line regression function corresponding to the one road line based on the boundary.

16. The apparatus of claim 15, wherein the processor is configured to search for an undrivable area from the first information, and search for the boundary based on the undrivable area.

17. The apparatus of claim 10, wherein, if it is determined that the two road lines are not detected, the processor is configured to predict one road line of the two road lines based on prestored information about a shape of the road, and correct the predicted road line based on the first information.

18. The apparatus of claim 17, wherein the processor is configured to generate a first line regression function corresponding to the one road line based on the prestored information, and correct the first line regression function such that the predicted road line is included in the drivable area.

19. A method of controlling driving of a vehicle, the method comprising:

determining whether at least one road line is not detected while the vehicle is being driven;

if it is determined that the at least one road line is not detected while the vehicle is being driven, predicting at least one road line for at least one undetected road line using at least one of information about a road obtained from a driving image captured by a sensor installed in the vehicle and prestored information about the road, and correcting the at least one predicted road line to be included in a drivable area;

determining the at least one corrected road line as the at least one undetected road line; and controlling the driving of the vehicle based on the at least one determined road line, wherein the drivable area is determined based on pixel values of the driving image.

20. The method of claim 19, further comprising determining pixels of the driving image as the drivable area if a probability value of the pixels to be the drivable area is higher than a preset threshold.

* * * * *